United States Patent [19]

Malcolm et al.

[11] Patent Number: 4,977,316

[45] Date of Patent: Dec. 11, 1990

[54] ENCODER DISC HAVING A TRACK FORMED BY TWO REGIONS OF DIFFERENT RADII

[75] Inventors: Timothy M. Malcolm, Conway; Garland H. Latta, Jr., Searcy, both of Ark.

[73] Assignee: Aerospace Controls Corporation, Little Rock, Ark.

[21] Appl. No.: 411,691

[22] Filed: Sep. 25, 1989

[51] Int. Cl.$^5$ .............................................. G01D 5/34
[52] U.S. Cl. ........................... 250/231.13; 250/211 K
[58] Field of Search ........ 250/211 K, 231 SE, 237 G; 356/375

[56] References Cited

U.S. PATENT DOCUMENTS

| | | |
|---|---|---|
| 3,296,427 | 4/1963 | Clemence . |
| 3,462,618 | 8/1969 | Miyata . |
| 4,103,155 | 7/1978 | Clark ............................ 250/211 K |
| 4,180,931 | 1/1980 | Osch ............................. 250/211 K |
| 4,475,169 | 10/1984 | Gilbert . |
| 4,631,694 | 12/1986 | Single . |

FOREIGN PATENT DOCUMENTS 276402 11/1987 European Pat. Off. .

*Primary Examiner*—David C. Nelms
*Assistant Examiner*—Que Tan Le
*Attorney, Agent, or Firm*—Willian Brinks Olds Hofer Gilson & Lione

[57] ABSTRACT

An encoder disc for a photoelectric shaft angle encoder includes a disc body which defines first and second regions. The first region is defined between two circles of differing radii and offset centers positioned such that the two circles are substantially tangent at one point and the smaller circle is contained within the larger circle. The second region is situated adjacent to the first region, and the first and second regions have differing light transmission characteristics. The first region forms a measuring track which varies in width substantially sinusoidally around the disc body. Especially good results are obtained when the two circles are offset from the central axis of the disc body by substantially equal amounts.

20 Claims, 3 Drawing Sheets

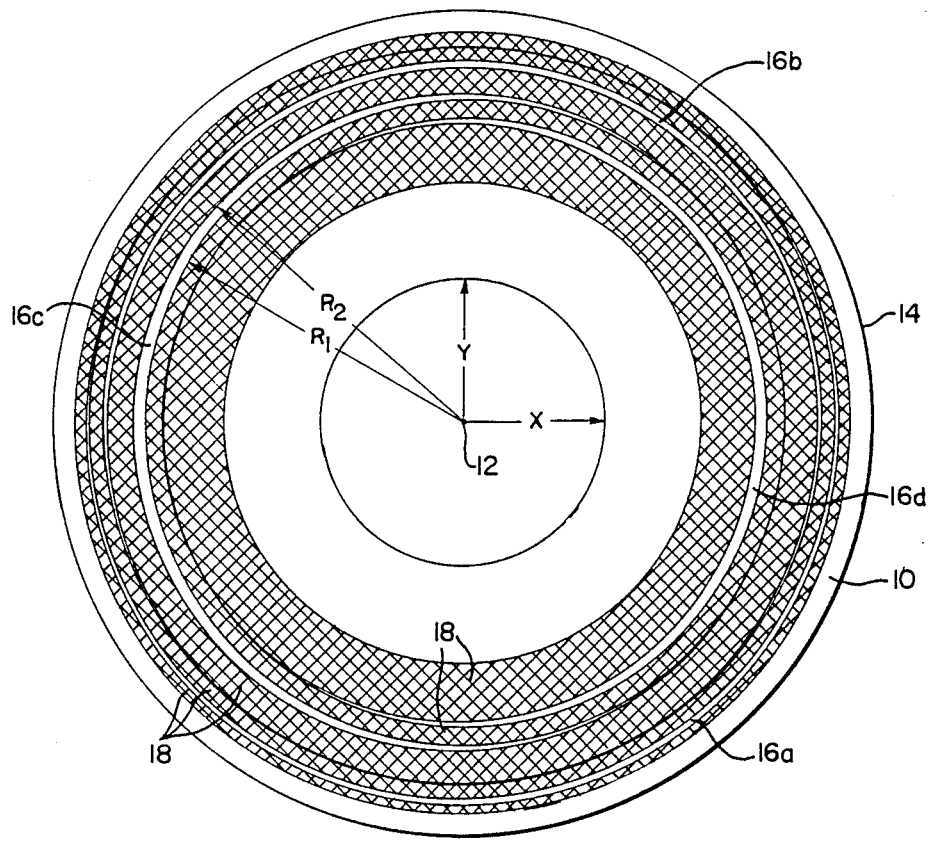
FIG_1a_
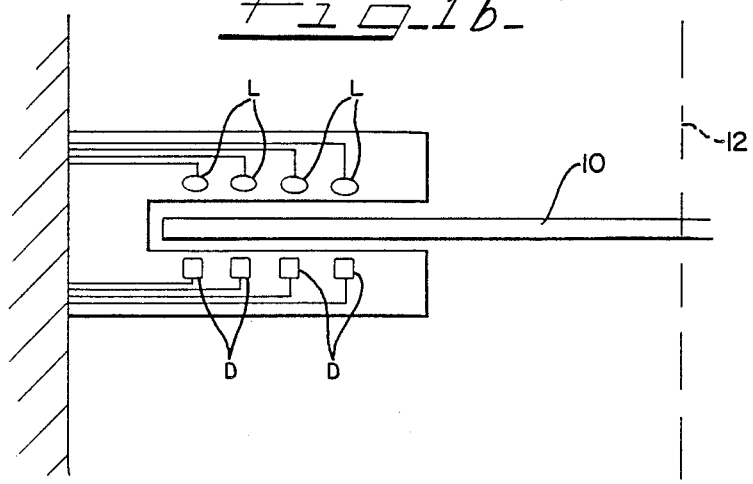
FIG_1b_

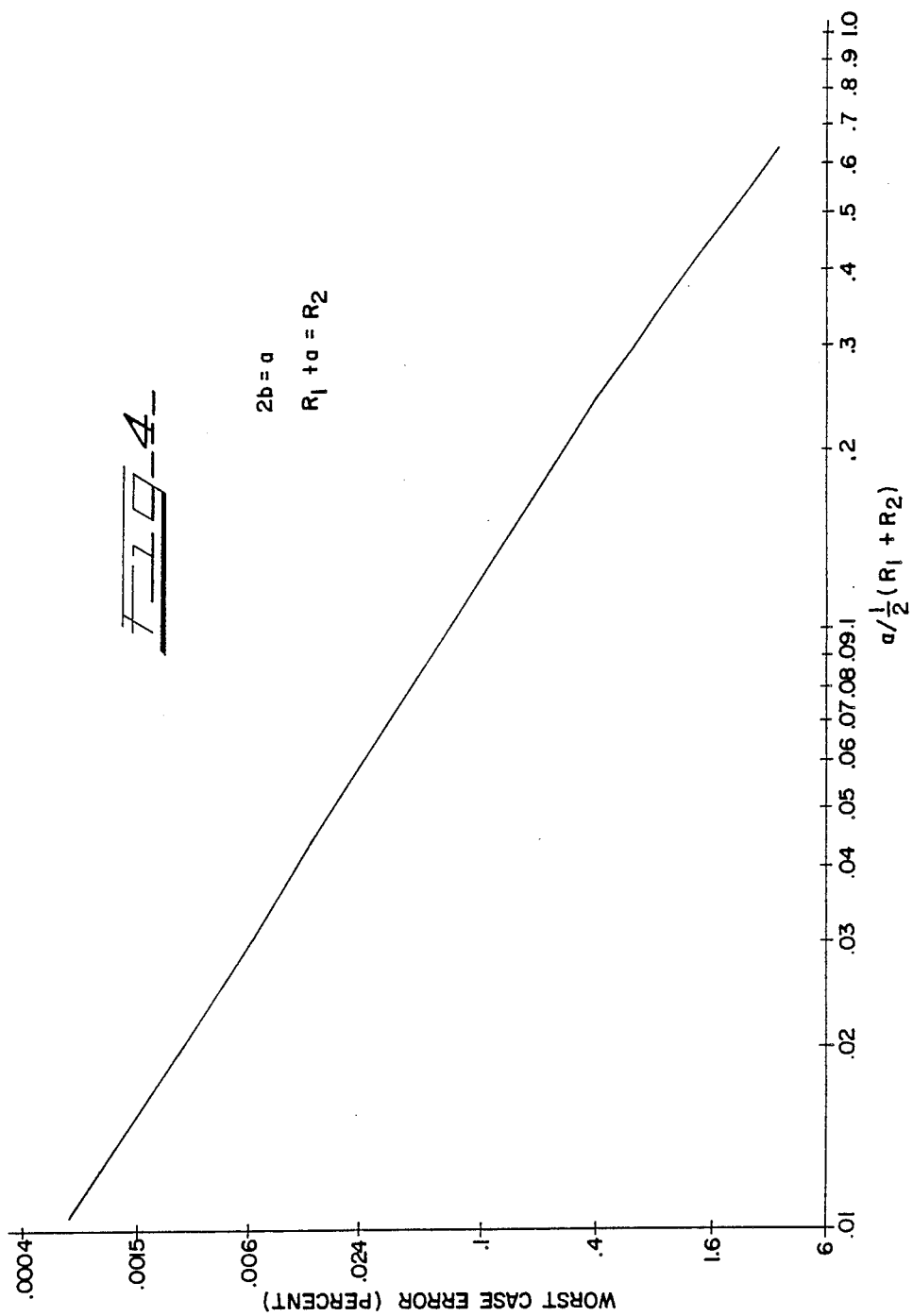

ENCODER DISC HAVING A TRACK FORMED BY TWO REGIONS OF DIFFERENT RADII

BACKGROUND OF THE INVENTION

This invention relates to an improved encoder disc for an encoder of the type having a scanning unit for scanning the disc to measure an angular position characteristic of the disc.

Encoders such as shaft angle encoders have been used for some time to provide an electronic signal indicative of the angular position of the shaft to which the encoder is mounted. Such encoders include discs having either absolute or incremental tracks, or a combination of the two. Absolute tracks provide a parameter that varies in accordance with the absolute position of the disc, while incremental tracks provide repetitive signals that can be counted to determine movement away from a reference position.

European Patent Application No. EP 0 276 402 discloses an encoder disc which, as shown in FIG. 2, includes both incremental and absolute tracks. Note in particular the outermost track which varies in width in a linear manner between a minimum width at 0 degrees and a maximum width at 180 degrees. This width variation is indicated in FIG. 4, where the signal U1 is shown as triangular in shape.

Though the triangular waveform produced by the encoder disc of the above-identified No. EP 0 276 402 is suitable for some applications, it is often preferable to provide a measuring track which varies in width sinusoidally rather than linearly. Such sinusoidal waveforms eliminate the cusps of triangular waveforms and associated scanning difficulties. Additionally, processing systems for sinusoidal signals are commonly available.

It is an object of the present invention to provide an improved encoder disc for an encoder of the type described above which provides such a sinusoidally varying measuring track in a particularly simple and cost effective manner.

SUMMARY OF THE INVENTION

According to this invention, an encoder disc for an encoder of the type described initially above comprises a disc body having first and second regions on the disc body. The first region is defined between two circles of differing radii and offset centers positioned such that the smaller circle is contained within the larger circle. The second region is situated adjacent the first region, and the first and second regions have differing characteristics of a scanned parameter such as light transmission. The first region forms a measuring track which varies in width substantially sinusoidally around the disc body.

In the preferred embodiment described below, the measuring track is transparent and the surrounding region of the disc is opaque. Preferably, the disc body defines a central axis of rotation, and the centers of the two circles are each offset by a substantially equal amount from the central axis such that the two centers and the central axis are colinear with the central axis positioned between the two centers. This arrangement has been found to provide a measuring track which approximates a sinusoidal variation in track width with surprising accuracy.

The invention itself, together with further objects and attendant advantages, will best be understood by reference to the following detailed description, taken in conjunction with the accompanying drawings.

BRIEF DESCRIPTION OF THE DRAWINGS

FIG. 1a is a plan view of an encoder disc which incorporates a presently preferred embodiment of this invention.

FIG. 1b is a schematic representation of an encoder which incorporates the encoder disc of FIG. 1.

FIG. 4 is a graph showing errors associated with the encoder disc of FIG. 1.

DETAILED DESCRIPTION OF THE PRESENTLY PREFERRED EMBODIMENTS

Figure 2:
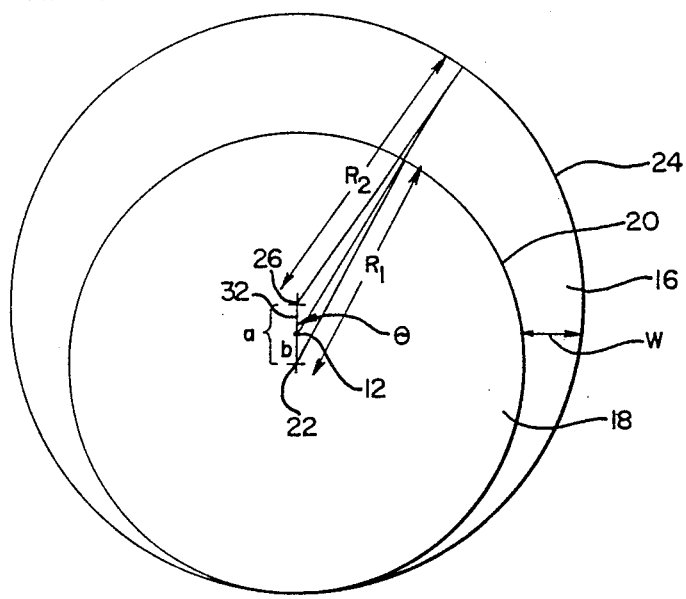
FIG. 2 is a schematic representation of the disc of FIG. 1, in which proportions have been exaggerated for clarity of illustration.

Turning now to the drawings, FIG. 1a shows a plan view of an encoder disc which incorporates a presently preferred embodiment of this invention. This disc includes a disc body 10 which defines a central axis of rotation 12 and a periphery 14. Typically, the periphery 14 is at a fixed radius from the central axis 12. The disc body 10 defines four first regions 16a–16d, and a second region 18 which differs in characteristics of a scanned parameter such as light transmission. Typically, one of the first and second regions 16a–16d, 18 is opaque, and the other is transparent. In this embodiment it is the first regions 16a–16d that are transparent. The second region 18 is immediately adjacent to the first regions 16a–16d and in this embodiment surrounds them. The following discussion applies equally to all of the first region's 16a–16d, and the reference number 16 will be used generically to refer to any of the first regions 16a–16d.

As best shown in FIG. 2, the first region 16 is defined as the region between an inner circle 20 having a radius $R_1$ and a center 22, and an outer circle 24 having a radius $R_2$ and a center 26. The central axis 12 and the centers 22, 26 are colinear along an offset axis 32, with the central axis 12 positioned between the two centers 22, 26.

FIG. 1b schematically shows the manner in which the encoder disc body 10 can be used in an encoder. As shown in FIG. 1b the encoder includes a scanning unit which is fixedly mounted with respect to the axis of rotation 12 of the disc body 10. The scanning unit includes a set of lamps L which generate light that passes through the disc body 10 to respective light sensors D. The amplitude of a signal generated by one of the sensors S is proportional to the amount of light passing through the respective first region 16. This parameter varies as a function of the width of the first region 16, which width is measured with respect to the central axis 12 and is indicated by the reference symbol W in FIG. 2. As the disc body 10 makes one complete revolution the signals generated by the sensors S vary from a minimum value at a selected angular position to a maximum value at the selected angular position plus 180 degrees and back to the minimum value. Surprisingly, it has been discovered that the width W of the first region 16 varies in a sinusoidal manner to an excellent approximation. Thus, the signal generated by the sensor D varies sinusoidally (to a close approximation) between the minimum and maximum values as the disc body 10 makes one complete revolution. As used herein, a sinusoidal variation includes a sine wave with a DC offset.

The encoder disc of FIG. 1 can be manufactured by a variety of methods, including the conventional photolithographic methods currently used to manufacture encoder discs. For example, one surface of the encoder disc body 10 can be plated with an opaque metal layer, and then photoresist techniques can be used to remove the opaque metal layer in the first region 16 bounded by the inner and outer circles 20, 24. One approach to fabrication is to coat the opaque metal layer with a photoresist, then to expose the photoresist outside the outer circle 24 and inside the inner circle, and then to use conventional techniques to remove the metal layer between the two circles 20, 24. Another possible approach is to expose such a layer of photoresist between the circles 20, 24 in a raster scan so as to expose the entire first region 16.

The sketch of FIG. 2 will be used to clarify the manner in which the width W of the first region 16 varies in an approximately sinusoidal manner. As shown in FIG. 2, the distance between the two centers 22, 26 is indicated by the reference symbol a, while the distance between the central axis 12 and the center 22 is indicated by the symbol b. As shown, the width W is measured along a radius proceeding from the central axis 12.

Figure 3:
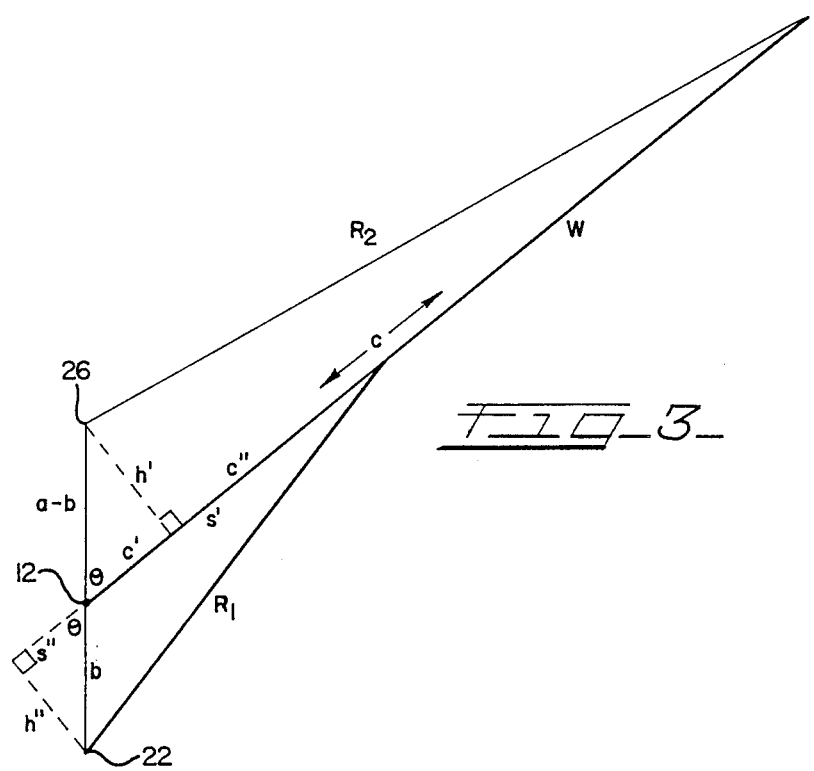
FIG. 3 is a geometrical construct used below to analyze the schematic representation of FIG. 2.

Using the notation defined in the enlarged geometrical construct of FIG. 3, the following geometrical identities are apparent:

$$h' = (a-b)\sin\theta; \quad \text{(EQ 1)}$$

$$C' = (a-b)\cos\theta; \quad \text{(EQ 2)}$$

$$C''^2 = R_2^2 + h'^2 \quad \text{(EQ 3)}$$

$C''$ can then be expressed as follows:

$$C'' = (R_2^2 - h'^2)^{\frac{1}{2}} = (R_2^2 - [(a-b)\sin\theta]^2)^{\frac{1}{2}} \quad \text{(EQ 4)}$$

$C$, which equals $C'$ plus $C''$, can be expressed as follows:

$$C = C' + C'' = (a-b)\cos\theta + (R_2^2 - [(a-b)\sin\theta]^2)^{\frac{1}{2}} \quad \text{(EQ 5)}$$

Similarly, the following three geometrical identities obtain:

$$h'' = b\sin\theta; \quad \text{(EQ 6)}$$

$$s'' = b\cos\theta; \quad \text{(EQ 7)}$$

$$(s' + s'')^2 = R_1^2 - h''^2 \quad \text{(EQ 8)}$$

These identities can be used to calculate $s'$ as follows:

$$s' = (R_1^2 - h''^2)^{\frac{1}{2}} - s''; \quad \text{(EQ 9)}$$

$$= (R_1^2 - (b\sin\theta)^2)^{\frac{1}{2}} - b\cos\theta. \quad \text{(EQ 10)}$$

The width W as shown in the geometrical construct of FIG. 3 is equal to $C - s'$. Using the identities set out above, W can be expressed as follows:

$$\begin{aligned} W &= C - s' \quad \text{(EQ. 11)} \\ &= (a-b)\cos\theta + (R_2^2 - [(a-b)\sin\theta]^2)^{\frac{1}{2}} \\ &\quad - (R_1^2 - (b\sin\theta)^2)^{\frac{1}{2}} + b\cos\theta; \\ &= a\cos\theta + (R_2^2 - [(a-b)\sin\theta]^2)^{\frac{1}{2}} \\ &\quad - (R_1^2 - (b\sin\theta)^2)^{\frac{1}{2}} \quad \text{(EQ 12)} \end{aligned}$$

For the specific case where $b=0$ (i.e. where the inner circle 20 is centered on the central axis 12) EQ 12 simplifies as follows:

$$W = a\cos\theta + (R_2^2 - (a\sin\theta)^2)^{\frac{1}{2}} - R_1 \text{ (for } b=0\text{)}. \quad \text{(EQ. 13)}$$

Given that the desired formula for W is $W = a = a\cos\theta$, EQ 13 indicates an error equal to the following:

$$\text{Error} = (R_2^2 - (a\sin\theta)^2)^{\frac{1}{2}} - R_1 - a. \quad \text{(EQ 14)}$$

Similarly, when the two circles 20, 24 are symmetrically positioned with respect to the central axis 12, i.e. where $a = 2b$ and $R_2 = R_1 + 2b$, EQ 12 simplifies as follows:

$$W = a\cos\theta + (R_2^2 - (b\sin\theta)^2)^{\frac{1}{2}} - (R_1^2 - (b\sin\theta)^2)^{\frac{1}{2}} \quad \text{(EQ 15)}$$

In this case, W again is desired to equal $a + a\cos\theta$, and the error between the desired and actual values of W is indicated as follows:

$$\text{Error} = (R_2^2 - (b\sin\theta)^2)^{\frac{1}{2}} - (R_1^2 - (b\sin\theta)^2)^{\frac{1}{2}} - a. \quad \text{(EQ 16)}$$

Analysis has shown that the error is minimized when b is selected to approximately equal $\frac{1}{2}a$. The minimum error is found at a point where b is slightly less than $\frac{1}{2}a$, where the offsets of the two circles (b and a-b) differ from one another by about 0.25%.

FIG. 4 is a graph showing the magnitude of the worst case error for the situation where the two circles are tangent at one point and $2b = a$. In FIG. 4 the X axis indicates the accuracy of the approximation (worst case percentage error) and the Y axis indicates the ratio of the maximum track width (a) divided by the average of the radii of the two circles that define the track ($\frac{1}{2}(R_1 + R_2)$). Note that for a 4 bit encoder (which requires an error less than one part in 16) $a/\frac{1}{2}(R_1 + R_2)$ must be less than 0.65. Similarly, for 8, 12 and 14 bit encoders (which require an error of less than one part in 256, 4096 and 16,389, respectively) $a/\frac{1}{2}(R_1 + R_2)$ must be less than 0.25, 0.06 and 0.03, respectively.

The values of $R_1$, $R_2$, a and b can be chosen to fit the application. Simply by way of example, the following table defines the dimensions of the embodiment of FIG. 1a in millimeters.

| First Region | 2R$_2$ / 2R$_1$ | Center X | Center Y |
|---|---|---|---|
| 16a | 42.05 | 0 | −0.120 |
|  | 41.55 | 0 | +0.120 |
| 16b | 40.05 | 0 | +0.120 |
|  | 39.55 | 0 | −0.120 |
| 16c | 36.16 | −0.120 | 0 |
|  | 35.50 | +0.120 | 0 |
| 16d | 33.53 | +0.120 | 0 |
|  | 32.88 | −0.120 | 0 |

From the foregoing, it should be apparent that an encoder disc has been described which provides the desired sinusoidally varying measuring track in a particularly simple manner. Of course, the measuring tracks described above will often be combined with other tracks, either absolute or incremental, on the encoder disc. For example, four sets of the measuring tracks described above can be provided on an encoder disc at 0 degrees, 90 degrees, 180 degrees and 270 degrees in order to produce a highly accurate substitute for a magnetic resolver or Inductosyn (Registered Trademark). In many applications it will be desirable to make the two circles 20, 24 almost tangent at one point to minimize the unchanging portion of the width W. However, tangency is not required in all applications.

Of course, a wide range of materials and fabrication techniques can be used to implement this invention. If desired, the first region 16 can be opaque and the second region 18 transparent. Furthermore, this invention is not limited to use with optical encoders, but can also be used with capacitive and inductive encoders. It is therefore intended that the foregoing detailed description be regarded as illustrative rather than limiting, and that it be understood that it is the following claims, including all equivalents, which are intended to define the scope of this invention.

We claim:

1. An encoder disc for an encoder of the type comprising a scanning unit for scanning the disc to measure an angular position characteristic of the disc, said encoder disc comprising:
    a disc body;
    first and second regions on the disc body, said first region defined between two circles of differing radii and offset centers positioned such that the smaller circle is contained within the larger radius circle, said second region situated adjacent said first region;
    said first and second regions having differing characteristics of a scanned parameter;
    said first region forming a measuring track which varies in width substantially sinusoidally around the disc body.

2. The inventions of claim 1 wherein one of the two regions is substantially opaque and the other is substantially transparent.

3. The invention of claim 2 wherein the first region is substantially transparent.

4. The invention of claim 1 wherein the two circles are substantially tangent at only one point.

5. The invention of claim 1 or 4 wherein the two circles have centers offset by an amount a, and wherein the ratio of a divided by the average of the radii of the two circles is less than 0.65.

6. The invention of claim 1 or 4 wherein the two circles have centers offset by an amount a, and wherein the ratio of a divided by the average of the radii of the two circles is less than 0.25.

7. The invention of claim 1 or 4 wherein the two circles have centers offset by an amount a, and wherein the ratio of a divided by the average of the radii of the two circles is less than 0.06.

8. The invention of claim 1 or 4 wherein the two circles have centers offset by an amount a, and wherein the ratio of a divided by the average of the radii of the two circles is less than 0.03.

9. An encoder disc for an encoder of the type comprising a scanning unit for scanning the disc to measure an angular position characteristic of the disc, said encoder disc comprising:
    a disc body having a central axis of rotation;
    first and second regions on the disc body which differ from one another in light transmission characteristics of a scanned parameter, said first region defined between two circles of differing radii and offset centers positioned such that the smaller radius circle is contained within the larger radius circle, said second region situated adjacent said first region, the central axis and the two centers being colinear along an offset axis with the central axis positioned between the two centers, the center of one of the circles being offset from the central axis by a first amount, the center of the other of the circles being offset from the central axis by an amount substantially equal to the first amount;
    said first region forming a measuring track which varies in width substantially sinusoidally around the disc body.

10. The invention of claim 9 wherein one of the two regions is substantially opaque and the other is substantially transparent.

11. The invention of claim 10 wherein the first region is substantially transparent.

12. The invention of claim 9 wherein the two circles are offset from the central axis by amounts which differ from one another by about 0.25%.

13. The invention of claim 9 wherein the disc body defines a periphery at a constant radius from the central axis.

14. The invention of claim 9 wherein the two circles are substantially tangent at only one point.

15. The invention of claim 9 or 14 wherein the ratio of two times the first amount divided by the average of the radii of the two circles is less than 0.65.

16. The invention of claim 9 or 14 wherein the ratio of two times the first amount divided by the average of the radii of the two circles is less than 0.25.

17. The invention of claim 9 or 14 wherein the ratio of two times the first amount divided by the average of the radii of the two circles is less than 0.06.

18. The invention of claim 9 or 14 wherein the ratio of two times the first amount divided by the average of the radii of the two circles is less than 0.03.

19. The invention of claim 1 wherein said first region extends over an arc of substantially 360° on the disc body.

20. The invention of claim 9 wherein said first region extends over an arc of substantially 360° on the disc body.

* * * * *

UNITED STATES PATENT AND TRADEMARK OFFICE
CERTIFICATE OF CORRECTION

PATENT NO. : 4,977,316

DATED : December 11, 1990

INVENTOR(S) : Timothy M. Malcolm et al.

Page 1 of 3

It is certified that error appears in the above-identified patent and that said Letters Patent is hereby corrected as shown below:

In column 2, lines 27 and 28, please delete the additional spaces after "regions", and before "16a-16d".

In column 2, line 36, please delete "region's" and substitute therefor --regions--.

In column 2, line 54, before "is" please delete "S" and substitute therefor --D--.

In column 2, line 60, before "vary" please delete "S" and substitute therefor --D--.

In column 3, line 36, please delete $$c'^2 = R_2^2 + h'^2 \qquad (EQ\ 3)$$

and substitute therefor $$c''^2 = R_2^2 - h'^2. \qquad (EQ\ 3).$$

In column 3, line 40, please delete $$c'' = (R_2^2 - h'^2)^{\frac{1}{2}} = (R_2^2[(a-b)\ \sin\theta]^2)^{\frac{1}{2}} \qquad (EQ\ 4)$$

and substitute therefor $$c'' = (R_2^2 - h'^2)^{\frac{1}{2}} = (R_2^2 - [(a-b(\ \sin\theta]^2)^{\frac{1}{2}}. \qquad (EQ\ 4).$$

In column 3, line 45, please delete ". (EQ 5)" and substitute therefor --(EQ 5)--.

In column 3, line 45, change "$\sin\theta)^2)^{\frac{1}{2}}$ .(EQ 5)" to read --$\sin\theta)^2)^{\frac{1}{2}}$. (EQ 5)--.

UNITED STATES PATENT AND TRADEMARK OFFICE
CERTIFICATE OF CORRECTION

PATENT NO. : 4,977,316

DATED : December 11, 1990

INVENTOR(S) : Timothy M. Malcolm et al.

It is certified that error appears in the above-identified patent and that said Letters Patent is hereby corrected as shown below:

In column 3, line 49, please delete $$h''=b \sin \theta; (EQ\ 6)$$

and substitute therefor $$h''=b \sin \theta; \qquad (EQ\ 6).$$

In column 3, line 51, please delete $$s''=b \cos \theta; (EQ\ 7)$$

and substitute therefor $$s''=b \cos \theta; \qquad (EQ\ 7).$$

In column 3, line 53, please delete $$s'=(R_1^2-h''^2)^{\frac{1}{2}}\text{tm}-s''; \ (EQ_9)$$

and substitute therefor $$s'=(R_1^2-h''^2)^{\frac{1}{2}}-s''; \qquad (EQ\ 9).$$

In column 3, line 62, please delete "(EQ. 11)".

In column 3, line 64, after the formula, in the right-hand margin please insert --(EQ 11)--.

In column 3, line 67, please delete $$=a \cos \theta + (R_2^2-[(a-b)\sin\theta]^2)^{\frac{1}{2}} \qquad -(EQ\ 12)$$

and substitute therefor $$=a \cos \theta + (R_2^2-[(a-b)\sin\theta]^2)^{\frac{1}{2}}- \qquad (EQ\ 12).$$

UNITED STATES PATENT AND TRADEMARK OFFICE
CERTIFICATE OF CORRECTION

PATENT NO. : 4,977,316
DATED : December 11, 1990
INVENTOR(S) : Timothy M. Malcolm et al.

It is certified that error appears in the above-identified patent and that said Letters Patent is hereby corrected as shown below:

In column 4, line 1, after the formula please insert --.--, and in the right-hand margin please delete ".".

In column 4, line 9 and 10, please delete

W=a=a cos θ, EQ 13 and substitute therefor

W=a+a cos θ, EQ 13

In column 4, line 32, please delete "Where" and substitute therefor --where--.

IN THE CLAIMS

In claim 1, line 9, before "circle" please insert --radius--.

Signed and Sealed this

Nineteenth Day of January, 1993

*Attest:*

DOUGLAS B. COMER

*Attesting Officer*     *Acting Commissioner of Patents and Trademarks*